United States Patent
Acharya et al.

(10) Patent No.: US 12,069,088 B2
(45) Date of Patent: Aug. 20, 2024

(54) CYBER-ATTACK DETECTION FOR NETWORKED ELECTRICAL POWER SYSTEM DEVICES

(71) Applicant: ABB Schweiz AG, Baden (CH)

(72) Inventors: Mithun P. Acharya, Cary, NC (US); Mirrasoul Mousavi, Santa Clara, CA (US); Karen J. Smiley, Raleigh, NC (US); Hang Xu, Nanjing (CN); Frank Mueller, Raleigh, NC (US)

(73) Assignee: ABB SCHWEIZ AG, Baden (CH)

( * ) Notice: Subject to any disclaimer, the term of this patent is extended or adjusted under 35 U.S.C. 154(b) by 1177 days.

(21) Appl. No.: 16/542,494

(22) Filed: Aug. 16, 2019

(65) Prior Publication Data

US 2021/0051173 A1 Feb. 18, 2021

(51) Int. Cl.
| | |
|---|---|
| H04L 29/06 | (2006.01) |
| G06N 3/044 | (2023.01) |
| H04L 9/40 | (2022.01) |
| G06N 3/08 | (2023.01) |

(52) U.S. Cl.
CPC ......... *H04L 63/1466* (2013.01); *G06N 3/044* (2023.01); *H04L 63/1416* (2013.01); *G06N 3/08* (2013.01)

(58) Field of Classification Search
CPC ............ H04L 63/1416; H04L 63/1466; G06N 3/0445

See application file for complete search history.

(56) References Cited

U.S. PATENT DOCUMENTS

| | | | |
|---|---|---|---|
| 2017/0264629 A1 | 9/2017 | Wei et al. | |
| 2018/0082058 A1* | 3/2018 | Ferragut | G06F 21/552 |
| 2018/0157831 A1 | 6/2018 | Abbaszadeh et al. | |
| 2019/0103762 A1* | 4/2019 | Dolezilek | H03K 19/17724 |

FOREIGN PATENT DOCUMENTS

| | | |
|---|---|---|
| EP | 3133793 A1 | 2/2017 |
| WO | 2017201520 A1 | 11/2017 |

OTHER PUBLICATIONS

International Search Report and Written Opinion, International Appln. No. PCT/US2020/45724, dated Oct. 4, 2020, 7 pgs. 2020.

* cited by examiner

*Primary Examiner* — Jeffrey C Pwu
*Assistant Examiner* — Thong P Truong
(74) *Attorney, Agent, or Firm* — Greenberg Traurig, LLP (57) ABSTRACT

Apparatuses, methods, systems, and techniques for detecting and effecting countermeasures against cyber-attacks on networked electrical power system (NEPS) devices include a trusted cyber-attack detection (TCAD) component including pre-trained cyber-attack detection logic which receives a first input indicating a physical parameter of a NEPS device and a second input indicating a computational state of a computer system of the NEPS device, determines an attack metric in response to the plurality of inputs. The attack metric can indicate whether the NEPS device is in the process of being attacked or whether the NEPS device has been successfully attacked and has been compromised.

20 Claims, 3 Drawing Sheets

CYBER-ATTACK DETECTION FOR NETWORKED ELECTRICAL POWER SYSTEM DEVICES

BACKGROUND

The present application relates generally to cybersecurity apparatuses, methods, systems, and techniques for networked electrical power system (NEPS) devices and, more particularly, but not exclusively, to real-time cyber-attack detection for NEPS devices via combined profiling of device computation and physics. A multitude of cyber-attack detection and mitigation techniques have been proposed to protect computing and communication network systems. A number of such techniques have also been proposed in connection with electrical power systems and devices thereof; however, these efforts face a number of unmet technical challenges and suffer from a number of shortcomings. For example, NEPS devices may have limited computing resources which limits the efficacy of conventional approaches. NEPS devices may also have limited communication bandwidth and less reliable communication capability that that relied upon by conventional approaches. NEPS devices also have unique physical and operational conditions which differ from those assumed by conventional approaches. NEPS devices may also require cyber-attack retrofitting or upgrades which exacerbate some of the aforementioned difficulties and pose further difficulties in their own right. There remains a significant need for the unique apparatuses, methods, systems, and techniques disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY OF THE DISCLOSURE

Apparatuses, methods, systems, and techniques for detecting and effecting countermeasures against cyber-attacks on networked electrical power system (NEPS) devices are disclosed. In certain forms, a NEPS device includes a trusted cyber-attack detection (TCAD) component comprising pre-trained cyber-attack detection logic which receives a first input indicating a physical state of a NEPS device and a second input indicating a computational state of a computer system of the NEPS device, and determines an attack metric in response to the plurality of inputs. The attack metric can indicate whether the NEPS device is in the process of being attacked or whether the NEPS device has been successfully attacked and has been compromised. Further embodiments, forms, objects, features, advantages, aspects, and benefits shall become apparent from the following description and drawings.

DETAILED DESCRIPTION OF ILLUSTRATIVE EMBODIMENTS

Figure 1:
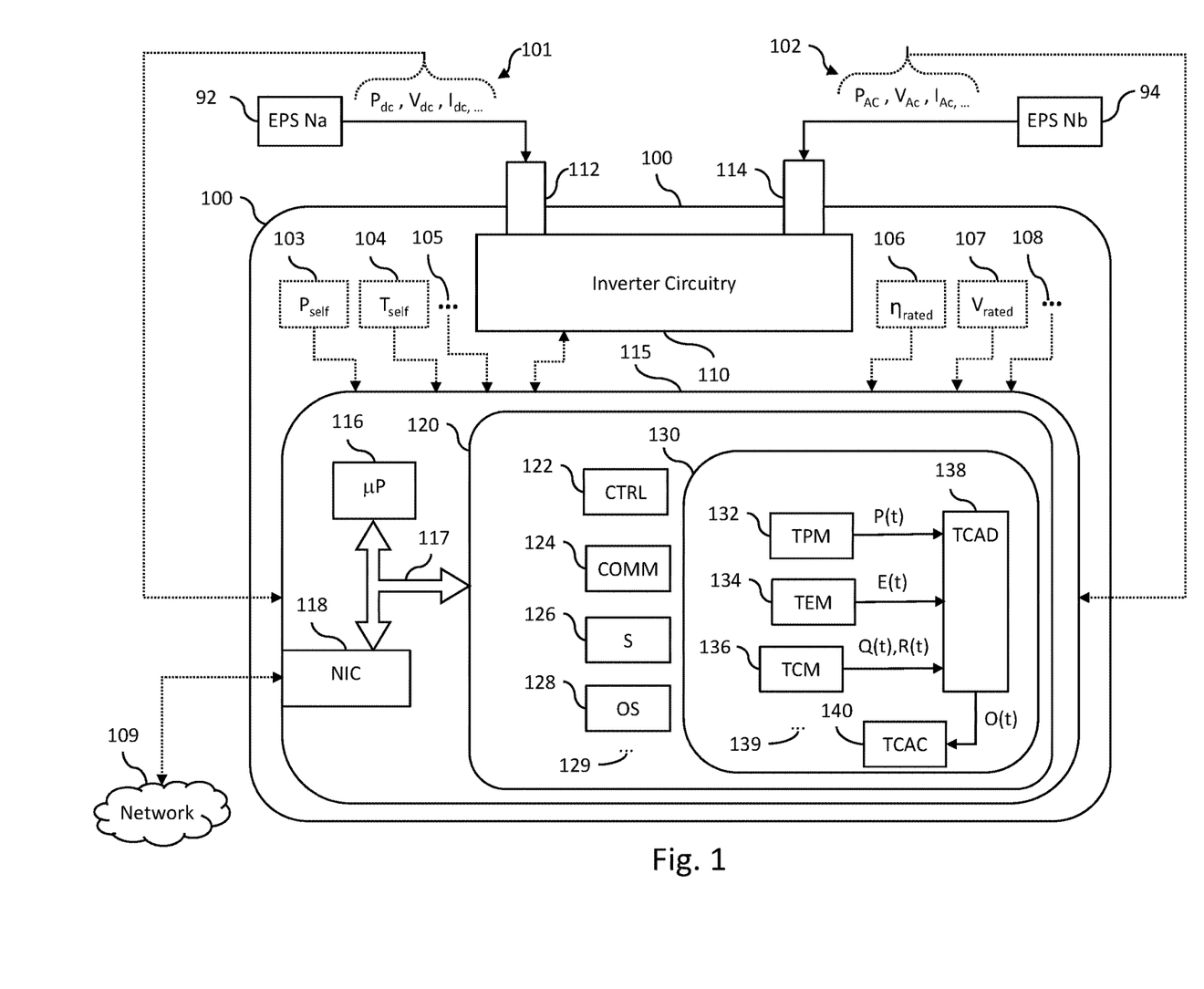
FIG. 1 is a schematic diagram illustrating certain aspects of an example networked electrical power system (NEPS) device.

With reference to FIG. 1, there is illustrated an example networked electrical power system (NEPS) device which may be any of a number of types of power electronics devices utilized in transmission, distribution, control, and/or provision of electrical power on the scale of a power grid, industrial facility, commercial building, or residential building. In the illustrated example, the NEPS device is an inverter 100 comprising inverter circuitry 110 which is operatively coupled with and configured to receive DC power ($P_{dc}$) at a DC power input 112, and an operatively coupled with and configured to output AC power ($P_{ac}$) at an AC power output 114. DC power input 112 is operatively coupled with a first node of an electrical power system (EPS Na) 92. DC power input 114 is operatively coupled with a second node of an electrical power system (EPS Nb) 94. Inverter circuitry 110 may include a variety of circuit topologies including, for example, H-bridge topologies, single-phase topologies, three-phase topologies, buck-boost topologies, and multilevel topologies among other topologies.

It shall be appreciated that the inverter 100 is but one example of a NEPS device according to the present disclosure and that a variety of other NEPS devices may be utilized including, for example, converters (e.g., AC-AC converters, AC-DC converters, bidirectional converters, DC-AC converters or active rectifiers, DC-DC converters, frequency converters, and other types of converters), circuit breakers, switches, drives (e.g., fixed frequency drives, variable frequency drives, and other types of drives), switches, switchgear, and relays, among other examples.

Inverter 100 includes a computer system which is configured to execute a plurality of programs stored in one or more non-transitory computer-readable memory media. In the illustrated embodiment, the computer system comprises an inverter control board 115 which comprises a microprocessor 116, a network interface component 118, and a non-transitory computer-readable memory medium 120 which are operatively coupled with and configured to communicate with one another via a bus 117. The computer system may further comprise additional elements which are not depicted to preserve clarity of illustration including, for example, additional digital circuitry, analog circuitry, sensors, signal conditioners, modulators, demodulators, arithmetic logic units (ALUs), central processing units (CPUs), limiters, oscillators, control clocks, amplifiers, signal conditioners, filters, format converters, communication ports, clamps, delay devices, memory devices, analog to digital (A/D) converters, digital to analog (D/A) converters, multiplexers, demultiplexers, modems, and/or different circuitry or components.

Microprocessor 116 is configured to access and execute one or more programs stored in non-transitory computer-readable memory medium 120. In the illustrated embodiment, microprocessor 116 is depicted as a single integrated circuit component. It shall be appreciated that the functionality of microprocessor 116 may be provided in multiple integrated circuit components. Network interface component 118 is operatively coupled with communication network 109 which may include a local-area network (LAN), one or more gateways, a wide-area network (WAN) up to and including a cloud-based network accessible over the Internet or over one or more private networks.

Non-transitory computer-readable memory medium 120 is configured to store a plurality of computer-executable programs. In the illustrated embodiment, the plurality of computer-executable programs include one or more inverter control programs 122 (e.g., a maximum power point tracking (MPPT) control program, or other types of control programs), one or more communication programs 124 which are configured to control communication between the inverter control board and communication network 109 via network interface component 118, one or more security programs 126 which provide security services such as the encryption functions for the secure shell protocol (SSH) and secure copy protocol (SCP), and one or more operating system or kernel programs 128 configured to support operation of other programs. The plurality of computer-executable programs may also include a variety of additional or alternate programs 129.

The plurality of computer-executable programs further includes one or more trusted programs 130 which are configured to provide cyber-attack security capabilities including prediction of, detection of, and protection against cyber-attacks on inverter 100. In the illustrated embodiment the one or more trusted programs include trusted physical parameter monitoring (TPM) component 132, trusted event monitoring (TEM) component 134, trusted computing monitoring (TCM) component 136, trusted cyber-attack detection (TCAD) component 138 which comprises pre-trained cyber-attack detection logic, and trusted cyber-attack countermeasure (TCAC) component 140. The one or more trusted programs may also include a variety of additional or alternate trusted components 139. It shall be appreciated that the foregoing components may be provided in combined implementations in which combinations of one or more of TPM component 132, TEM component 134, TCM component 136, TCAD component 138 TCAC) component 140 or other trusted components 139 are provided in a single or common structural or logical component. It shall be further appreciated that a number of different techniques may be utilized to secure the components of trusted programs 130 including, for example, use of encryption, secure or hidden memory locations, secure architectures, secure coding, and other types of hardware-based or software-based security measures.

TPM component 132 is configured to monitor and provide a trusted output P(t) which quantifies one or more physical parameters of inverter 100 or, in other embodiments, another type of NEPS device. It shall be appreciated that the term physical parameter refers to a physical or operational condition or state of a NEPS device, for example, current, voltage, power, resistance, temperature, and a variety of other physical or operational conditions or states which may be dynamically measured, estimated, or otherwise dynamically determined as well as to rated or nominal characteristics of a NEPS device, for example, rated maximum power, rated temperature, or other rated or nominal physical or operational characteristics which may be static. It shall be further appreciated that trusted output P(t) may also be considered a trusted input from the point of reference of TCAD 138.

Output P(t) may be structured as a vector which represents the physical parameters of the inverter 110 at time t. As noted above, such physical parameters may include dynamically measured or estimated information such as electrical input information 101 (e.g., DC input power ($P_{dc}$), DC input voltage ($V_{dc}$), DC input current ($I_{dc}$), or other electrical input information), electrical output information 102 (e.g., AC output power ($P_{ac}$), AC output voltage ($V_{ac}$), AC output current ($I_{ac}$), or other electrical output information), and internal electrical or physical characteristics of the inverter (e.g., inverter power consumption ($P_{self}$) information 103, inverter temperature information ($T_{self}$) information 104 or other internal electrical or physical characteristics of inverter 100 or its environment such as inverter insulation resistance or ambient temperature). Such physical parameters may also include static nominal or rated information (sometimes referred to as nameplate information) such as rated efficiency information 106, rated operating voltage information 107, as well as other static parameters 108 pertaining nominal or rated characteristics of the inverter.

In certain embodiments, the parameters quantified by P(t) may comprise a set of pre-existing parameters communicated by a telemetry function of inverter 100, in other embodiments, another type of NEPS device. In certain such forms, the parameters quantified by P(t) may consist essentially of a set of pre-existing parameters communicated by a telemetry function of inverter 100. Such forms may be utilized in connection with an upgrade or retrofitting of a cyber-security functionality whereby the extent of hardware addition or replacement, as well as software addition or replacement, may be mitigated or minimized by leveraging previously implemented information capability in the parameters quantified by P(t).

TEM component 134 is configured to monitor and provide a trusted output E(t) which quantifies one or more alarm events of inverter 100 or, in other embodiments, another type of NEPS device. Inverter alarm events may represent undesirable inverter states, warnings, errors, or other conditions warranting a notification of a condition of the inverter or, in other embodiments, another type of NEPS device. For example, alarm event E025 is an inverter alarm event that indicates that the isolation resistance of the inverter dipped below a predetermined threshold. It shall be appreciated that trusted output E(t) may also be considered a trusted input from the point of reference of TCAD 138.

Trusted output E(t) may be structured as a vector which represents a set of all events that activated in the last k time units between times (t-k) and t. Inverter events may have a duration between an activation time and return to normal time. The duration of inverter events may be accounted for by using a recurrent neural network (RNN) in connection with the pre-trained cyber-attack detection logic of TCAD component 138 which will allow early detection, advanced notice, or forecasting of an attack on inverter 100.

In certain embodiments, the parameters quantified by E(t) may comprise a set of pre-existing parameters communicated by a telemetry function of inverter 100, in other embodiments, another type of NEPS device. In certain such forms, the parameters quantified by E(t) may consist essentially of a set of pre-existing parameters communicated by a telemetry function of inverter 100. Such forms may be utilized in connection with an upgrade or retrofitting of a cyber-security functionality whereby the extent of hardware addition or replacement as well as software addition or replacement may be mitigated or minimized by leveraging previously implemented information capability in the parameters quantified by E(t).

TCM component 136 is configured to monitor and provide a trusted output Q(t) which quantifies one or more computing resource usage metrics of inverter control board 115 (or, in other embodiments, another computer system of inverter 100 or of another type of NEPS device). It shall be appreciated that trusted output Q(t) may also be considered a trusted input from the point of reference of TCAD 138.

Trusted output Q(t) may be structured as a vector representing computer resource metrics such as CPU time, power consumption, RAM consumption, cache hits/misses, or other metrics of computer activity for the set of all programs (PROG) running on the inverter. In the illustrated embodiment set PROG may comprise the plurality of computer-executable programs including the one or more inverter control programs 122, the one or more communication programs 124, the one or more security programs 126, the one or more operating system or kernel programs 128, the additional or alternate programs 129, and the trusted programs 130 including TPM component 132, TEM component 134, TCM component 136, TCAD component 138, TCAC component 140, and additional or alternate trusted programs 139. It should be appreciated that at a given time t, one or more inputs to PROG may come from P(t).

In certain embodiments, the parameters quantified by Q(t) may comprise a set of pre-existing parameters utilized by or available in the operating system, utilities or other programs of inverter 100, in other embodiments, another type of NEPS device. In certain such forms, the parameters quantified by Q(t) may consist essentially of a set of such pre-existing parameters. Such forms may be utilized in connection with an upgrade or retrofitting of a cyber-security functionality whereby the extent of hardware addition or replacement as well as software addition or replacement may be mitigated or minimized by leveraging previously implemented information capability in the parameters quantified by Q(t).

TCM component 136 is also configured to monitor and provide a trusted output R(t) which quantifies an execution time for one or more execution paths of the plurality of programs provided in inverter control board 115 (or, in other embodiments, another computer system of inverter 100 or of another type of NEPS device). A number of execution paths (n) may be defined in PROG whose execution times are monitored. A statistical characterization of execution times for each path such as moving average may be maintained and updated over time. It shall be appreciated that trusted output R(t) may also be considered a trusted input from the point of reference of TCAD 138.

Trusted output R(t) may be structured as a vector representing the n moving averages at time t. The designation of execution paths n may account for the particulars of a given program. For a given program, one or more critical execution paths for a program may be defined based on knowledge of the structure and function of the program and the expected vulnerability to cyber-attacks. For example, critical paths for security programs 126 may be defined for known or potential attacks on the encryption functions for the secure shell protocol (SSH) and secure copy protocol (SCP).

In certain embodiments, the parameters quantified by R(t) may comprise a set of pre-existing parameters utilized by or available in the operating system, utilities or other programs of inverter 100, in other embodiments, another type of NEPS device. In certain such forms, the parameters quantified by R(t) may consist essentially of a set of such pre-existing parameters. Such forms may be utilized in connection with an upgrade or retrofitting of a cyber-security functionality whereby the extent of hardware addition or replacement as well as software addition or replacement may be mitigated or minimized by leveraging previously implemented information capability in the parameters quantified by R(t).

TCAD component 138 receives inputs P(t), E(t), Q(t), and R(t), and processes these inputs with pre-trained cyber-attack detection logic to determine and output an attack metric O(t) which is provided to and evaluated by TCAC component 140 as indicating one of three conditions: (a) the NEPS device is not under attack, (b) the NEPS device is in the process of being attacked, and (c) the NEPS device has been successfully attacked or compromised. The values of the attack metric O(t) indicating conditions (a), (b), and (c) may be predetermined by pre-training the attack detection logic of TCAD component 138 and TCAC component 140 and, in certain embodiments, may be dynamically adapted during operation of TCAD component 138 and TCAC component 140.

If the attack metric O(t) indicates either condition (b) or condition (c) the NEPS device has been successfully attacked or compromised, disconnecting the NEPS device from at least one of the electrical power system and the communication network with which it is operatively coupled. In response to attack metric O(t) indicating either condition (b) or condition (c), TCAC component 140 may execute, initiate or trigger a cyber-attack countermeasure. In certain forms, TCAC component 140 may disconnect the NEPS device from the electrical power system with which it operatively coupled, the communication network with which it is operatively coupled, or from both the electrical power system and the communication network. In certain forms, the disconnection may be based entirely upon the state of the attack metric of the NEPS device. In certain forms, the disconnection may be partially based upon the state of the attack metric of the NEPS device. In such forms, the disconnection may be further based upon one or more other network attack metrics, for example, one or more gateway-level attack metrics, a cloud-level attack metric, or both. In such forms, the TCAC component 140 may be considered to trigger or initiate a disconnection contingent on the values or states of one or more other network attack metrics. It shall be appreciated references to disconnecting, disconnection or grammatical variations thereof include and encompass such triggering or initiation unless expressly indicated to the contrary.

Figure 2:
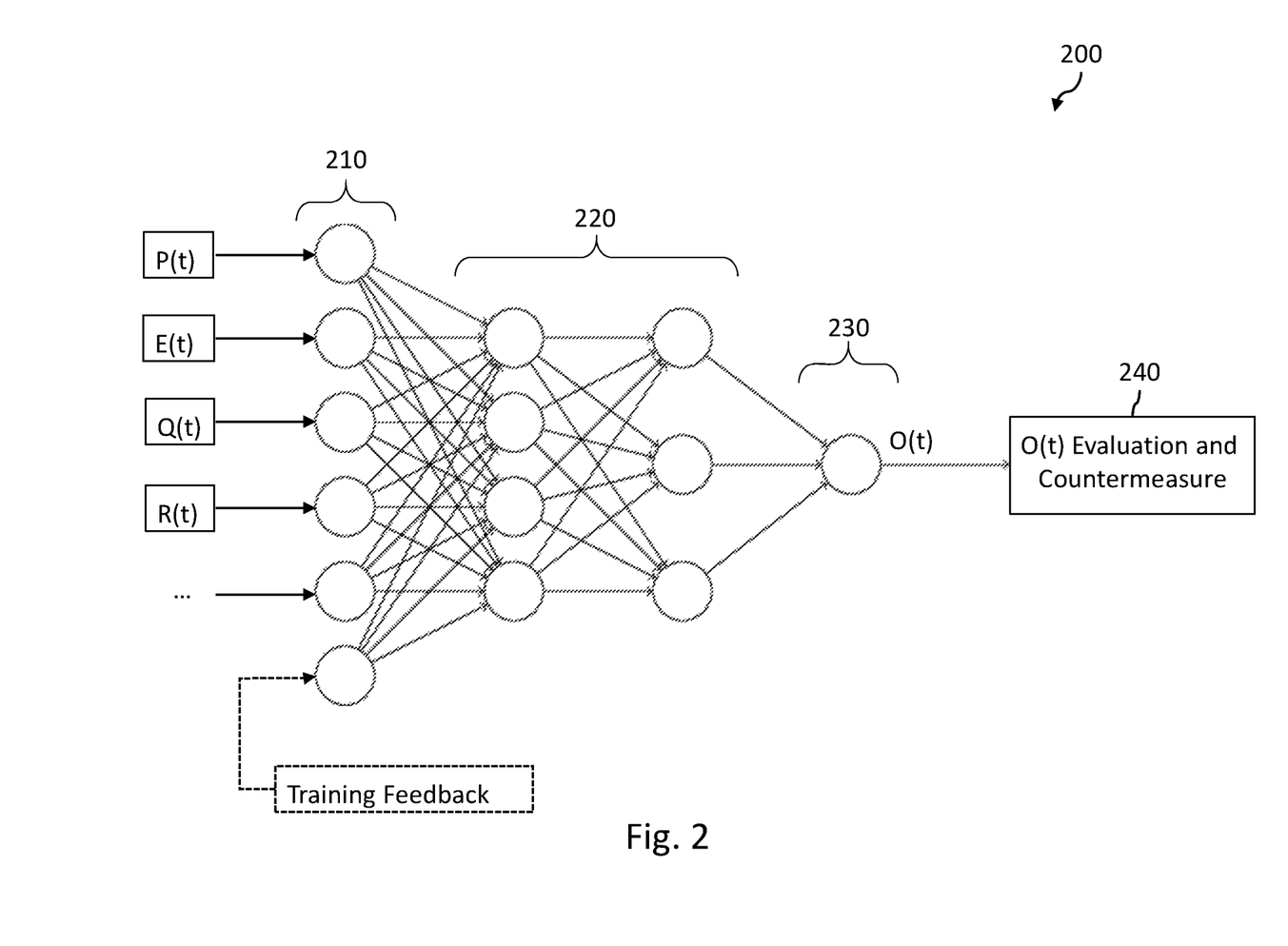
FIG. 2 is a schematic diagram illustrating certain aspects of an example trusted cyber-attack detection (TCAD) component.

With reference to FIG. 2, there is illustrated trusted cyber-attack detection logic 200 (sometimes referred to as "detection logic") which is one example of attack detection logic that may be provided in or implemented in a TCAD component such as TCAD component 138 of inverter 100 or another TCAD component of a NEPS device. Detection logic 200 is one example of a trusted cyber-attack detection logic component that may be trained in an offline (e.g., laboratory) environment and thereafter implemented in a computer system of an in-filed, online NEPS device such as inverter 100. After undergoing training, detection logic 200 may be referred to as a pre-trained cyber-attack detection logic.

Detection logic 200 may be provided in a number of forms. In the illustrated embodiment, detection logic 200 is provided in the form of a neural network 205 including an input layer 210, a neuron layer 220 which may be hidden, and an output layer 230. In certain forms, the neural network may be a recurrent neural network (RNN) which facilitates a predictive or prognostic functionality whereby an attack is identified substantially ab initio (e.g., at the beginning of an attack, shortly after an attack attempt has been initiated, or after an attack has been initiated but in advance of success of the attack). In other embodiments, detection logic may be provided with alternate supervised machine learning techniques.

With continuing reference to FIG. 2, during a training operation, detection logic 200 may be trained by operating a NEPS device, a proxy device, or a simulation of a NEPS device in a controlled environment such as a laboratory under conditions emulating service conditions, for example, a range of ambient temperatures, power levels, etc. During such operation, one or more training programs, either autonomous or human-assisted, will initiate a plurality of different cyber-attack attempts. During training, detection logic 200 is provided with inputs P(t), E(t), Q(t), and R(t) as well as with a training feedback input which indicates whether an attack is occurring and which may also indicate the degree of completion or success of the attack.

In response to the received inputs, detection 200 logic will autonomously or quasi-autonomously develop, establish, modify and organize connections in neuron layer 220 which provide an attack metric O(t) whose value indicates one of several conditions. A first value or set or range of values of attack metric O(t) may indicate that the NEPS device is not under attack. A second value or set or range of values of attack metric O(t) may indicate that the NEPS device is under attack but not yet compromised including, forecast, predicted, substantially ab initio, and early-stage states of attack. A third value or set or range of values of attack metric O(t) may indicate NEPS device has been successfully attacked and is compromised. The value of attack metric O(t) at a given time may be evaluated by one or more logic components 240 which determine whether to initiate a countermeasure or, in some configurations, whether to pass a layer-specific attack metric which may be considered a countermeasure request to another networked device.

It shall be appreciated that the training of detection logic 200 differs from programming in a number of aspects. For example, training may include an autonomous or quasi-autonomous development, establishment, modification, and/or organization of the structure and functionality of detection logic 200 which is not known by or readily visible to an autonomous training program or a human-assisted training program.

Once training has occurred, detection logic 200 may be implemented in a TCAD component of a field-installed NEPS device such as inverter 100 or another type of NEPS device. This may occur by placing the actual NEPS device which was trained in the field or by providing an instance of pre-trained detection logic in another NEPS device with characteristics that are the same as or similar to those of the training device or simulation. In-service training and adaptation may occur after the NEPS device is installed in the field. For example, values of attack metric O(t) may be compared with other information regarding an in-service attack and detection logic may be updated in response thereto.

Figure 3:
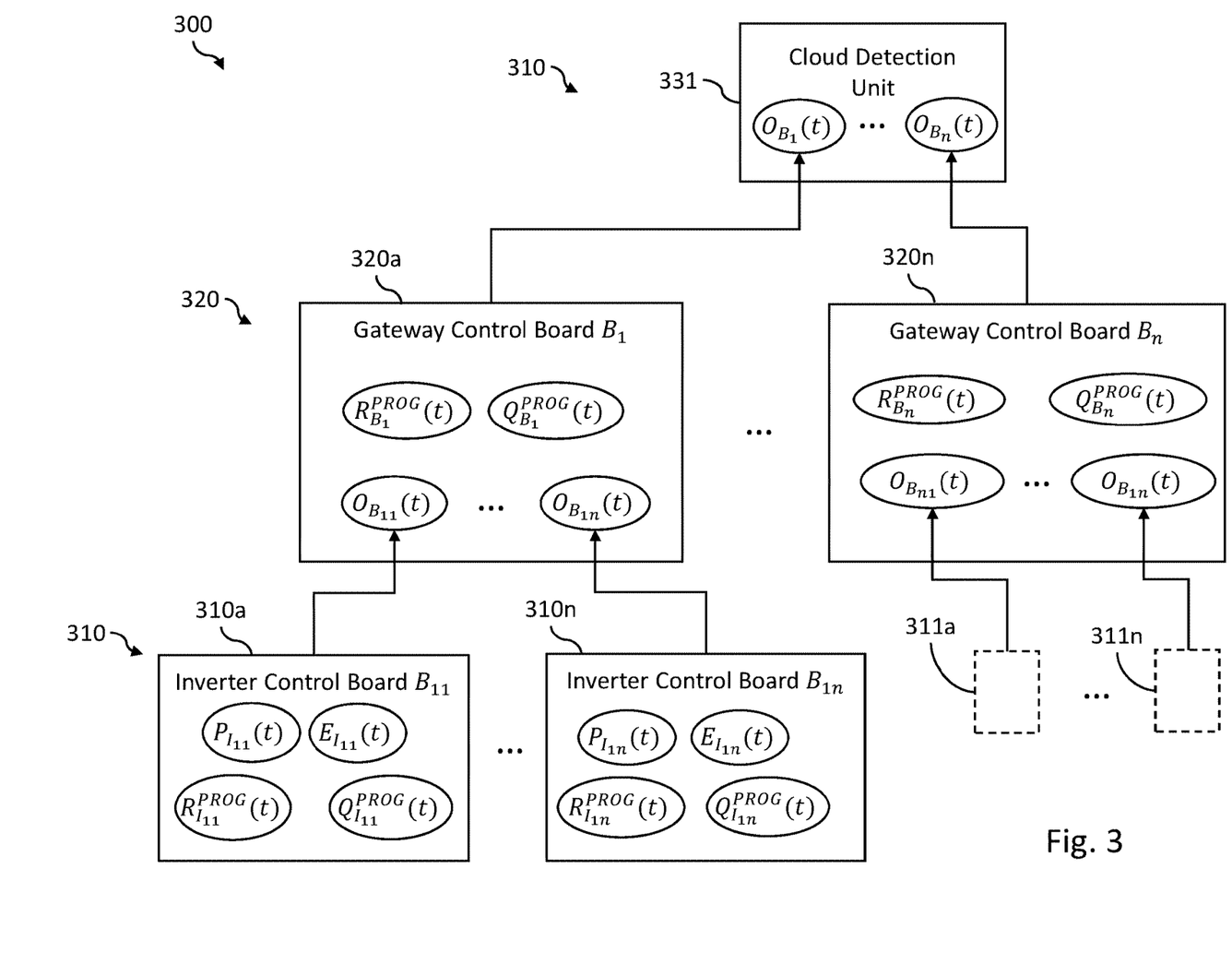
FIG. 3 is a schematic diagram illustrating certain aspects of an example system including a multi-layer hierarchy of TCAD components.

With reference to FIG. 3, there is illustrated an example system 300 including a device layer 310, a gateway layer 320 and a could layer 330. Device layer 310 includes a plurality NEPS devices 310a through 310n, 311a through 311n, and potentially additional NEPS devices. Each NEPS device of device layer 310 includes a computer system configured with a trusted device-layer program component. In the illustrated embodiment, NEPS devices 310a through 310n are inverters including control boards and device-layer trusted program components which are the same as or similar to inverter control board 115 of inverter 100 and its constituent elements and components. In other embodiments computer system and trusted program component may be provided in other forms including one or more of a TPM component, a TEM component, a TCM component, a TCAD component, and a TCAC component. Each device-layer trusted program component of the NEPS devices of device layer 310 includes a detection logic, such as a pre-trained neural network or other pre-trained machine learning component, for example, detection logic 200 or the modifications and variants thereof described above.

In the illustrated embodiment, NEPS devices 310a through 310n are provided as inverters including inverter control boards $B_{11}$ through $B_{1n}$, respectively. The device-layer trusted program component of inverter control boards $B_{11}$ utilizes trusted outputs $P_{I_{11}}(t)$, $E_{I_{11}}(t)$, and $R_{I_{11}}^{PROG}(t)$, and $Q_{I_{11}}^{PROG}(t)$. It shall be appreciated that these inputs may have the same or similar attributes as the above-described outputs P(t), E(t), Q(t), and R(t), respectively. It shall be further appreciated that these parameters may be considered outputs or inputs depending on which element of the device-layer trusted program component is utilized as a point of reference. In response to these outputs, device-layer trusted program component of inverter control board $B_{11}$ determines and outputs an attack metric $O_{B_{11}}(t)$, which is provided to gateway 320a. As noted above, attack metric $O_{B_{11}}(t)$ may serve as a partial basis for disconnection of inverter control board $B_{11}$ and/or disconnection of other devices of system 300 contingent on other attack metrics.

The device-layer trusted program components of other inverter control boards comprise similar characteristics, elements, functions, and operations. Thus, for example, inverter control board $B_{11}$ utilizes trusted outputs $P_{I_{11}}(t)$, $E_{I_{11}}(t)$, $R_{I_{11}}^{PROG}(t)$, and $Q_{I_{11}}^{PROG}(t)$ and determines and outputs an attack metric $O_{B_{11}}(t)$, which is provided to gateway 320a. Similarly, control board $B_{1n}$ utilizes trusted outputs $P_{I_{1n}}(t)$, $E_{I_{1n}}(t)$, $R_{I_{1n}}^{PROG}(t)$, and $Q_{I_{1n}}^{PROG}(t)$ and determines and outputs an attack metric $O_{B_{1n}}(t)$, which is provided to gateway 320n. As noted above, attack metric $O_{B_{11}}(t)$ may serve as a partial basis for disconnection of inverter control board $B_{11}$ and/or disconnection of other devices of system 300 contingent on other attack metrics. Furthermore, it shall be appreciated that substantially the same description applies, mutatis mutandis, to device-layer trusted program components of the computer systems of other NEPS devices of NEPS device layer 320.

Gateway layer 320 includes a plurality gateway devices 310a through 310n and potentially additional gateway devices. Each of the gateway devices of gateway layer 320 includes a control board or other computer system configured with a trusted gateway-layer program component. The trusted gateway-layer program components may include a number of components which are the same as or similar to the device-layer trusted program components, for example, a TCM component, a TCAD component, and a TCAC component. In some forms, the trusted gateway-layer program components may include may omit certain aspects of the device-layer trusted program components, for example, one or both of a TPM component and a TEM component.

In the illustrated embodiment, the computing devices of gateway devices 320a through 320n are provided as control boards $B_1$ through $B_n$, respectively and each include a gateway-level trusted program component comprising a gateway-layer detection logic, such as a pre-trained neural network or other pre-trained machine-learning component. The gateway-layer attack detection logic may be structured, trained, and operated in a manner similar to that described in connection with detection logic 200 or the modifications and variants thereof described above, but with modifications accounting for the difference in training between gateway devices and NEPS devices.

The structure, training, and operation of the gateway-layer attack detection logic of gateway control board 320a receives and uses as inputs, attack metrics $O_{B_{11}}(t)$ through $O_{B_{1n}}(t)$ which are received from NEPS devices 310a through 310n, as well as trusted outputs $R_{B_1}^{PROG}(t)$ and $Q_{B_1}^{PROG}(t)$ which are determined and utilized by gateway control board 320a in a manner analogous to the trusted outputs Q(t) and R(t) described above. In response to the aforementioned attack metrics and trusted outputs, gateway-layer attack detection logic of gateway control board 320a determines and outputs a gateway-layer attack metric $O_{B_1}(t)$, which is provided to cloud detection unit 330. As noted above, gateway-layer attack metric $O_{B_1}(t)$ may serve as a partial basis for disconnection of one or more inverter control boards, gateway control boards or other computer systems of system 300 contingent on other attack metrics.

The structure, training, and operation of the gateway-layer attack detection logic of gateway control board 320n receives and uses as inputs, attack metrics $O_{B_{n1}}(t)$ through $O_{B_{1n}}(t)$ which are received from NEPS devices 311a through 311n, as well as trusted outputs $R_{B_n}^{PROG}(t)$ and $Q_{B_n}^{PROG}(t)$ which are determined and utilized by gateway control board 320n in a manner analogous to the trusted outputs Q(t) and R(t) described above. In response to the aforementioned attack metrics and trusted outputs, gateway-layer attack detection logic of gateway control board 320n determines and outputs a gateway-layer attack metric $O_{B_n}(t)$, which is provided to cloud detection unit 331. As noted above, gateway-layer attack metric $O_{B_n}(t)$ may serve as a partial basis for disconnection of one or more inverter control boards, gateway control boards or other computer systems of system 300 contingent on other attack metrics.

Could layer 330 comprises a cloud-based computer system including cloud detection unit 331 which is configured with a trusted cloud-layer program component. The trusted cloud-layer program components may include a number of components which are the same as or similar to the device-layer trusted program components, for example, a TCAD component and a TCAC component. In some forms, the trusted cloud-layer program components may include may omit certain aspects of the device-layer trusted program components, for example, one or more of a TCM component, of a TPM component and a TEM component.

Cloud detection unit includes a cloud-level trusted program component comprising a gateway-layer detection logic, such as a pre-trained neural network or other pre-trained machine-learning component. The cloud-layer attack detection logic may be structured, trained, and operated in a manner similar to that described in connection with detection logic 200 or the modifications and variants thereof described above, but with modifications accounting for the difference between cloud devices and NEPS devices.

In certain forms, the ultimate decision on disconnection of NEPS devices and/or gateways may be vested in the cloud-layer attack detection logic. In certain forms, the cloud-layer attack detection logic may exercise supervisory or override authority over the gateway-layer attack detection logic and/or the device-layer attack detection logic providing a system which may initiate and execute disconnection from any of multiple attack detection logic implementations which may be provided at different hierarchical layers of system 300. In certain forms, the disconnection may be partially based upon the output of the device-layer attack detection logic of one or more NEPS devices, the gateway-layer attack detection logic of one or more gateway devices, and the cloud-layer attack detection logic.

The distributed architecture of system 300 can detect isolated attacks on single inverters or a plant as well as coordinated attacks across plants, portfolios, or regions. Trusted attack detection logic at each layer, such as layer-specific neural networks, are trained using simulated attacks in the laboratory and operated in combination when installed in the field. Additionally, from the foregoing description, the hierarchical aspects of system 300 may be understood. In one aspect, different control boards deployed on different levels will get inputs from different entities. For example, network-layer trusted program component control board $B_{11}$ will receive and utilize the outputs $P_{I_{11}}(t)$, $E_{I_{11}}(t)$, $R_{I_{11}}^{PROG}(t)$, $Q_{I_{11}}^{PROG}(t)$. The gateway-layer trusted program component of gateway control board $B_1$ will receive and utilize the outputs $O_{b_{11}}(t), \ldots, O_{B_{1n}}(t)$, $R_{b_1}^{PROG}(t)$, $Q_{B_1}^{PROG}(t)$. The cloud-layer trusted program component of cloud detection unit 340 will receive and utilize the outputs $O_{B_1}(t), \ldots, O_{B_n}(t)$. This hierarchical or tree-type architecture may be configured unidirectionally so that only the higher level gateway nodes can access the model data or system parameters of lower-level gateways or inverters.

A number of embodiments shall now be further described. A first example embodiment is a method comprising: providing a networked electrical power system (NEPS) device operatively coupled with an electrical power system and a communication network and including an electrical input, an electrical output, and a computer system configured to execute a plurality of programs stored in one or more non-transitory computer-readable memory media, the plurality of programs including a trusted cyber-attack detection (TCAD) component including pre-trained cyber-attack detection logic; receiving with the TCAD component a plurality of inputs including at least a first input indicating a physical parameter of the NEPS device and a second input indicating a computational state of the computer system; determining with the pre-trained cyber-attack detection logic of the TCAD component an attack metric in response to the plurality of inputs, the attack metric indicating one of: (a) the NEPS device is not under attack, (b) the NEPS device is under attack but not yet compromised, and (c) the NEPS device has been successfully attacked; and triggering disconnection of the NEPS device from at least one of the electrical power system and the communication network based at least in part upon the attack metric indicating either (b) the NEPS device is under attack but not yet compromised or (c) the NEPS device has been successfully attacked.

In certain forms of the first example embodiment the plurality of inputs received with the TCAD component comprise one or more of: a first input quantifying one or more physical parameters of the NEPS device, a second input quantifying one or more computing resource usage metrics of the computer system, a third input quantifying an execution time for one or more execution paths of the plurality of programs, and a fourth input quantifying one or more alarm events for the NEPS device. In certain further forms, the first input comprises a vector P(t) representing a plurality of physical parameters of the NEPS device at a time t. In certain further forms, the plurality of physical parameters of the NEPS device include dynamically determined information about at least one physical or operational state of the NEPS device and static information about at least one nominal or rated characteristic of the NEPS device. In certain further forms, the second input comprises a vector Q(t) representing the one or more net computing resource usage metrics utilized at a time t by a set of programs comprising all of the executable programs of the computer system. In certain further forms, the third input comprises a vector R(t) representing a moving average of execution time for a plurality of predetermined execution paths of the plurality of programs. In certain further forms, the fourth input comprises a vector E(t) representing a set of all alarm events of the NEPS device activated over a range of a past time to a current time. In certain further forms, the TCAD component includes a recurrent neural network configured to provide an advance prediction of a cyber-attack.

Certain forms of the first example embodiment comprise: providing a plurality of network gateways each operatively coupled with a plurality of NEPS devices, the plurality of NEPS devices including said NEPS device, providing a device-level attack metric from each of the plurality of NEPS devices to at least one of the plurality of network gateways, the device-level attack metric including said attack metric, and determining with a gateway-level TCAD component of each of the plurality of network gateways a gateway-level attack metric in response to the plurality of device-level attack metrics and at least a gateway-level input indicating a computational state of the gateway; wherein the act of triggering disconnection of the NEPS device is further based upon one or more of the gateway-level attack metrics. Certain further forms comprise providing a cloud-level TCAD component operatively coupled with the plurality of network gateways, wherein the cloud-level TCAD component is configured to: receive a plurality of the gateway-level attack metrics, and determine and output a cloud-level attack metric in response to the plurality gateway-level attack metrics; wherein the act of triggering disconnection of the NEPS device is further based upon the cloud-level attack metric.

A second example embodiment is a system comprising: a networked electrical power system (NEPS) device including an electrical input and an electrical output structured to be coupled with an electrical power system and a computer system structured to be coupled with a communication network and configured to execute a plurality of programs stored in one or more non-transitory computer-readable memory media, the plurality of programs including a trusted cyber-attack detection (TCAD) component including pre-trained cyber-attack detection logic configured to: receive a plurality of inputs including at least a first input indicating a physical parameter of the NEPS device and a second input indicating a computational state of the computer system; determine an attack metric in response to the plurality of inputs; and initiate disconnection of the NEPS device from at least one of the electrical power system and the communication network at least partially based upon the attack metric indicating that the NEPS device is in the process of being attacked or that the NEPS device has been successfully attacked.

In certain forms of the second example embodiment, the plurality of inputs comprise one or more of: a first input indicating one or more physical parameters of the NEPS device, a second input indicating one or more computing resource usage metrics of the computer system, a third input indicating an execution time for one or more execution paths of the plurality of programs, and a fourth input indicating one or more alarm events for the NEPS device.

Certain forms of the second example embodiment comprise a plurality of network gateways each operatively coupled with one or more of a plurality of NEPS devices, wherein each of the plurality of NEPS devices is configured to provide a device-level attack metric to at least one of the plurality of gateways, and each of the plurality of gateways includes a respective gateway-level TCAD component including gateway-level pre-trained cyber-attack detection logic configured to: receive one or more of the device-level attack metrics, and determine a gateway-level attack metric in response to the plurality of the respective device-level attack metrics and at least a gateway-level input indicating a computational state of the gateway; wherein disconnection of the NEPS device from at least one of the electrical power system and the communication network is further initiated by the gateway-level attack metric. Certain further forms comprise a cloud-level TCAD component operatively coupled with the plurality of network gateways, wherein the cloud-level TCAD component is configured to: receive a plurality of the gateway-level attack metrics, and determine and output a cloud-level attack metric in response to the plurality gateway-level attack metrics; wherein disconnection of the NEPS device from at least one of the electrical power system and the communication network is further initiated by the cloud-level attack metric.

A third example embodiment is a networked electrical power system (NEPS) device comprising: an electrical input and an electrical output structured to be coupled with an electrical power system; and a computer system structured to be coupled with a communication network and configured to execute a plurality of programs stored in one or more non-transitory computer-readable memory media, the plurality of programs including a trusted cyber-attack detection (TCAD) component including pre-trained cyber-attack detection logic configured to: receive a plurality of inputs including at least a first input indicating a physical parameter of the NEPS device and a second input indicating a computational state of the computer system; determine an attack metric in response to the plurality of inputs and attack metric; and disconnect the NEPS device from at least one of the electrical power system and the communication network with which it is operatively coupled at least partially based upon the attack metric indicating that the NEPS device is in the process of being attacked or that the NEPS device has been successfully attacked.

In certain forms of the third example embodiment the plurality of inputs received with the TCAD component comprise one or more of a first input indicating one or more physical parameters of the NEPS device, a second input indicating one or more computing resource usage metrics of the computer system, a third input indicating an of execution time for one or more execution paths of the plurality of programs, and a fourth input indicating one or more alarm events for the NEPS device. In certain further forms, the networked electrical power system (NEPS) device of claim 17 wherein the first input comprises a vector P(t) representing a plurality of physical parameters of the NEPS device at a time t. In certain further forms, the second input comprises a vector Q(t) representing the or more net computing resource usage metrics utilized at the time t by a set of programs of the executable programs of the computer system. In certain further forms, the third input comprises a vector R(t) representing a moving average as of the time t of execution time for a plurality of predetermined execution paths of the plurality of programs. In certain further forms, the fourth input comprises a vector E(t) representing a set of all alarm events as of the time t of the NEPS device activated over a range of time.

In certain forms of the first example embodiment, the NEPS device comprises an inverter. In certain forms of the second example embodiment, the NEPS device comprises an inverter. In certain forms of the third example embodiment, the NEPS device comprises an inverter.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method comprising:
providing a networked electrical power system (NEPS) device operatively coupled with an electrical power system and a communication network,
wherein the NEPS device includes one or more of an inverter, a converter, a circuit breaker, a switch, a drive, switchgear, a relay, or combination thereof,
wherein the NEPS device includes:
an electrical input,
an electrical output, and
a microprocessor configured to execute a plurality of programs stored in one or more non-transitory computer-readable memory media,
wherein the plurality of programs include a trusted cyber-attack detection (TCAD) component including pre-trained cyber-attack detection logic;
receiving, with the TCAD component, a plurality of inputs including at least a first input indicating a physical parameter of the NEPS device and a second input indicating a computational state of the microprocessor;
determining, with the pre-trained cyber-attack detection logic of the TCAD component, an attack metric in response to the plurality of inputs,
wherein the attack metric indicates one of:
(a) the NEPS device is not under attack,
(b) the NEPS device is under attack but not yet compromised, or
(c) the NEPS device has been successfully attacked; and
triggering disconnection of the NEPS device from at least one of the electrical power system and the communication network based at least in part upon the attack metric indicating either (b) the NEPS device is under attack but not yet compromised or (c) the NEPS device has been successfully attacked.

2. The method of claim 1, wherein the plurality of inputs received with the TCAD component comprise:
a first input quantifying one or more physical parameters of the NEPS device,
a second input quantifying one or more net computing resource usage metrics of the microprocessor,
a third input quantifying an execution time for one or more execution paths of the plurality of programs, and
a fourth input quantifying one or more alarm events for the NEPS device.

3. The method of claim 2, wherein the first input comprises a vector P(t) representing a plurality of physical parameters of the NEPS device at a time t.

4. The method of claim 3, wherein the plurality of physical parameters of the NEPS device include dynamically determined information about at least one physical or operational state of the NEPS device and static information about at least one nominal or rated characteristic of the NEPS device.

5. The method of claim 2, wherein the second input comprises a vector Q(t) representing the one or more net computing resource usage metrics utilized at a time t by a set of programs comprising all of the executable programs of the microprocessor.

6. The method of claim 2, wherein the third input comprises a vector R(t) representing a moving average of execution time for a plurality of predetermined execution paths of the plurality of programs.

7. The method of claim 2, wherein the fourth input comprises a vector E(t) representing a set of all alarm events of the NEPS device activated over a range of a past time to a current time.

8. The method of claim 7, wherein the TCAD component includes a recurrent neural network configured to provide an advance prediction of a cyber-attack.

9. The method of claim 1, wherein the NEPS device is a first NEPS device of a plurality of NEPS devices, the method comprising:
providing a plurality of network gateways each operatively coupled with the plurality of NEPS devices,
providing a device-level attack metric from each of the plurality of NEPS devices to at least one of the plurality of network gateways, the device-level attack metric including the attack metric, and
determining with a gateway-level TCAD component of each of the plurality of network gateways a gateway-level attack metric in response to the plurality of device-level attack metrics and at least a gateway-level input indicating a computational state of the gateway;
wherein triggering disconnection of the first NEPS device of the plurality of NEPS devices is further based upon one or more of the gateway-level attack metrics.

10. The method of claim 9, comprising:
providing a cloud-level TCAD component operatively coupled with the plurality of network gateways,
wherein the cloud-level TCAD component is configured to:
receive a plurality of the gateway-level attack metrics, and
determine and output a cloud-level attack metric in response to the plurality gateway-level attack metrics;
wherein the act of triggering disconnection of the NEPS device is further based upon the cloud-level attack metric.

11. A system comprising:
a networked electrical power system (NEPS) device,
wherein the NEPS device includes one or more of an inverter, a converter, a circuit breaker, a switch, a drive, switchgear, a relay, or combination thereof, wherein the NEPS device includes:
an electrical input and an electrical output structured to be coupled with an electrical power system, and
a microprocessor structured to be coupled with a communication network and configured to execute a plurality of programs stored in one or more non-transitory computer-readable memory media,
wherein the plurality of programs include a trusted cyber-attack detection (TCAD) component including pre-trained cyber-attack detection logic configured to:
receive a plurality of inputs including at least a first input indicating a physical parameter of the NEPS device and a second input indicating a computational state of the microprocessor;
determine an attack metric in response to the plurality of inputs; and
initiate disconnection of the NEPS device from at least one of the electrical power system and the communication network at least partially based upon the attack metric indicating that the NEPS device is in the process of being attacked or that the NEPS device has been successfully attacked.

12. The system of claim 11, wherein the plurality of inputs comprise:
a first input indicating one or more physical parameters of the NEPS device,
a second input indicating one or more computing resource usage metrics of the microprocessor,
a third input indicating an execution time for one or more execution paths of the plurality of programs, and
a fourth input indicating one or more alarm events for the NEPS device.

13. The system of claim 11, wherein the NEPS device is a first of a plurality of NEPS devices, the system comprising a plurality of network gateways each operatively coupled with one or more of the plurality of NEPS devices, wherein
each of the plurality of NEPS devices is configured to provide a device-level attack metric to at least one of the plurality of gateways, and
each of the plurality of gateways includes a respective gateway-level TCAD component including gateway-level pre-trained cyber-attack detection logic configured to:
receive one or more of the device-level attack metrics, and
determine a gateway-level attack metric in response to the plurality of the respective device-level attack metrics and at least a gateway-level input indicating a computational state of the gateway;
wherein disconnection of the NEPS device from at least one of the electrical power system and the communication network is further initiated by the gateway-level attack metric.

14. The system of claim 13, comprising a cloud-level TCAD component operatively coupled with the plurality of network gateways, wherein the cloud-level TCAD component is configured to:
receive a plurality of the gateway-level attack metrics, and
determine and output a cloud-level attack metric in response to the plurality gateway-level attack metrics;
wherein disconnection of the NEPS device from at least one of the electrical power system and the communication network is further initiated by the cloud-level attack metric.

15. A networked electrical power system (NEPS) device comprising:
an electrical input and an electrical output structured to be coupled with an electrical power system; and
a microprocessor structured to be coupled with a communication network and configured to execute a plurality of programs stored in one or more non-transitory computer-readable memory media, wherein the plurality of programs includes a trusted cyber-attack detection (TCAD) component including pre-trained cyber-attack detection logic configured to:
receive a plurality of inputs including at least a first input indicating a physical parameter of the NEPS device and a second input indicating a computational state of the microprocessor;
determine an attack metric in response to the plurality of inputs and attack metric; and
disconnect the NEPS device from at least one of the electrical power system and the communication network with which it is operatively coupled at least partially based upon the attack metric indicating that the NEPS device is in the process of being attacked or that the NEPS device has been successfully attacked,
wherein the NEPS device includes one or more of an inverter, a converter, a circuit breaker, a switch, a drive, switchgear, a relay, or combination thereof.

16. The networked electrical power system (NEPS) device of claim 15, wherein the plurality of inputs received with the TCAD component comprise:
a first input indicating one or more physical parameters of the NEPS device,
a second input indicating one or more net computing resource usage metrics of the microprocessor,
a third input indicating an execution time for one or more execution paths of the plurality of programs, and
a fourth input indicating one or more alarm events for the NEPS device.

17. The networked electrical power system (NEPS) device of claim 16, wherein the first input comprises a vector P(t) representing a plurality of physical parameters of the NEPS device at a time t.

18. The networked electrical power system (NEPS) device of claim 17, wherein the second input comprises a vector Q(t) representing the one or more net computing resource usage metrics utilized at the time t by a set of programs of the executable programs of the microprocessor.

19. The networked electrical power system (NEPS) device of claim 18, wherein the third input comprises a vector R(t) representing a moving average as of the time t of execution time for a plurality of predetermined execution paths of the plurality of programs.

20. The networked electrical power system (NEPS) device of claim 18, wherein the fourth input comprises a vector E(t) representing a set of all alarm events as of the time t of the NEPS device activated over a range of time.

* * * * *